United States Patent [19]

Yamanaka et al.

[11] Patent Number: 4,638,856

[45] Date of Patent: Jan. 27, 1987

[54] OIL FILTER AND COOLER FOR INTERNAL COMBUSTION ENGINE

[75] Inventors: Yasutoshi Yamanaka, Kariya; Kazunobu Ageishi, Toyota; Teruo Izumida, Kariya, all of Japan

[73] Assignee: Nippondenso Co., Ltd., Kariya, Japan

[21] Appl. No.: 762,533

[22] Filed: Aug. 5, 1985

[30] Foreign Application Priority Data

Aug. 7, 1984 [JP] Japan .................................. 59-166227

[51] Int. Cl.⁴ ............................................. F28F 19/00
[52] U.S. Cl. ..................................... 165/119; 165/35; 165/38; 210/168
[58] Field of Search ........................ 165/38, 35, 119; 210/168

[56] References Cited

U.S. PATENT DOCUMENTS

| | | | |
|---|---|---|---|
| 3,743,011 | 7/1973 | Frost | 165/38 |
| 4,036,755 | 7/1977 | Dahm et al. | 210/168 |
| 4,360,055 | 11/1982 | Frost | 165/167 X |

FOREIGN PATENT DOCUMENTS

| | | |
|---|---|---|
| 53-149980 | 11/1978 | Japan . |
| 55-48238 | 12/1980 | Japan . |
| 1376561 | 12/1974 | United Kingdom . |

*Primary Examiner*—William R. Cline
*Assistant Examiner*—Richard R. Cole
*Attorney, Agent, or Firm*—Cushman, Darby & Cushman

[57] ABSTRACT

A heat exchanger apparatus includes a heat exchanger constituted by a multiplicity of heat exchanger units laminated one upon another and a filter having first and second filter elements for removing any unnecessary substance mixed into a working fluid. A fixing member (bolt) is disposed such as to extent through the heat exchanger so that the heat exchanger and the filter are integrally secured to each other. The heat exchanger is provided therein with a communicating passage communicated with the upstream side of the first and second filter elements, a main flow passage communicated with the downstream side of the first filter element, and a subsidiary flow passage communicated with the downstream side of the second filter element.

6 Claims, 7 Drawing Figures

OIL FILTER AND COOLER FOR INTERNAL COMBUSTION ENGINE

BACKGROUND OF THE INVENTION

1. Field of the Invention

The present invention relates to a heat exchanger apparatus which may be effectively employed, for example, for an oil cooler which effects heat exchange between lubricating oil and cooling water for an automotive internal combustion engine for the purpose of cooling the oil.

2. Description of the Prior Art

A conventional heat exchanger apparatus of the type described above has heretofore been arranged such that an oil cooler is mounted on the upper side of an engine block or a filter bracket, and an oil filter is integrally mounted on the oil cooler through a bolt disposed in the center of the oil cooler, thus constituting a cooling system in which the oil is cooled before being introduced to the side of the engine. A cooling system of this type has recently been devised in which the oil filter is constituted by two filter element layers in order to cope with the need to filter a large amount of carbon contained in the engine oil (particularly for diesel engines). For example, as disclosed in the specification of Japanese Utility Model Unexamined Publication No. 149980/1978, the oil filter is constituted by two filter element layers, that is, a first filter element which serves as an ordinary oil filter and a second filter element for absorbing carbon. However, since the second filter element is extremely dense, the resistance against the oil passing therethrough (the pressure loss of the oil) is increased by a large margin, which fact unfavorably leads to a substantial reduction in the hydraulic pressure of the oil introduced to the engine. In order to avoid such a pressure reduction, an arrangement is employed in which directly introduced into an oil pan portion (an oil reservoir portion) in such a manner that a pressure difference is produced between the upstream and downstream sides of the second filter element, thereby allowing the oil to smoothly pass through the second filter element and thus to be filtered.

However, this arrangement disadvantageously prevents the above-described oil filter from being integrated with an oil cooler, since piping for introducing the oil into the oil pan portion is interposed between the oil filter and the oil cooler.

SUMMARY OF THE INVENTION

Accordingly, it is a primary object of the present invention to provide a heat exchanger apparatus which may be suitably employed in a cooling system in which the above-described oil filter and an oil cooler are integrated with each other.

To this end, the invention provides a heat exchanger apparatus in which a heat exchanger is provided with a main flow passage which provides communication between the heat exchanger and the first filter element of a filter which has first and second filter elements and further a subsidiary flow passage which provides communication between the heat exchanger and the second filter element.

By virtue of the above-described arrangement, the fluid which has passed through the first filter element of the filter is introduced into the main flow passage of the heat exchanger and thereby cooled, while the fluid which has passed through the second filter element of the filter is allowed to flow out through the subsidiary flow passage of the heat exchanger.

Thus, it is possible according to the present invention to integrate a heat exchanger with a filter which has first and second filter elements by forming the heat exchanger with a subsidiary flow passage which provides communication between the heat exchanger and the second filter element of the filter. Since it is only necessary for the heat exchanger to be additionally formed with the subsidiary flow passage, the heat exchanger has a reduced cost and is very easily mounted. Further, it is advantageously possible for the heat exchanger to be easily put into practical use without any lowering in the heat exchanger efficiency.

The above and other objects, features and advantages of the present invention will become clear from the following description of the preferred embodiments thereof, taken in conjunction with the accompanying drawings.

DESCRIPTION OF THE PREFERRED EMBODIMENTS

A first embodiment of the invention will be described hereinunder with reference to the accompanying drawings.

A filter, that is, an oil filter A which has two filter elements, will first be explained with reference to FIG. 1.

A first filter element 1 has a ring shape and is folded such as to have a chrysanthemum-like cross-section. A cylindrical metallic reinforcing member 2 is provided with a multiplicity of small bores 2a. A cylindrical metallic partition member 3 has no small bores provided but has a plurality of oil passing bores 3b opening to the side of the upstream end portion of the first filter element 1. The first filter element 1 is housed in the ring-shaped space which is defined between the reinforcing member 2 and the partition member 3.

A second filter element 4 has a ring shape and is constituted by a thin-paper like filter medium which is wound around the partition member 3 in a roll shape. Ring-shaped filter paper 18 is disposed at each of the upstream and downstream ends of the element 4. The reference numeral 5 denotes a cylindrical metallic reinforcing member with a closed end and without any bore.

A ring-shaped metallic end plate 7 has an opening 7a formed in its center. The end plate 7 is mounted on one end of the first filter element 1 in such a manner that this end is closed. The end plate 7 is caulked at the portions thereof which bear on the respective ends of the reinforcing member 2 and the partition member 3 over the entire circumference.

A ring-shaped metallic end plate 8 is provided with a recess 8a formed such as to receive the other end of the first filter element 1, a plurality of projections 8b for supporting the second filter element 4, and a plurality of oil passing openings 8c. The end plate 8 is fitted on the other end portion of each of the first and second filter elements 1 and 4 in such a manner that these end portions are closed. It is to be noted that both end portions of the first filter element 1 are respectively bonded to the end plates 7 and 8 by resin adhesives 9 and 10. Further, a ring-shaped expanded portion 5a is integrally formed on the bottom of the reinforcing member 5 on the side thereof which is closer to its center. Additionally, a plurality of oil passing opening 5c are formed in the center of the member 5.

A cylindrical metallic casing 12 has its one end closed and the other end open. The open end of the casing 12 is secured by caulking to a ring-shaped metallic casing 13 over the entire circumference thereof. The casing 13 has oil passing openings 13a formed in its center. The first and second filter elements 1 and 4 are housed in the space defined by the casings 12 and 13. Further, a washer 14 is secured inside the casings 12 and 13 by means of the reinforcing member 5 and the like. The washer 14 is formed in its center with a threaded portion 14a for receiving a bolt 48 of a heat exchanger (described later) in order to secure the oil filter A to the heat exchanger. The washer 14 further has a plurality of oil passing openings 14b formed such as to oppose the respective oil passing openings 13a of the casing 13, the oil passing openings 14b being adapted to introduce the oil from the heat exchanger into the oil filter A.

Figure 1:
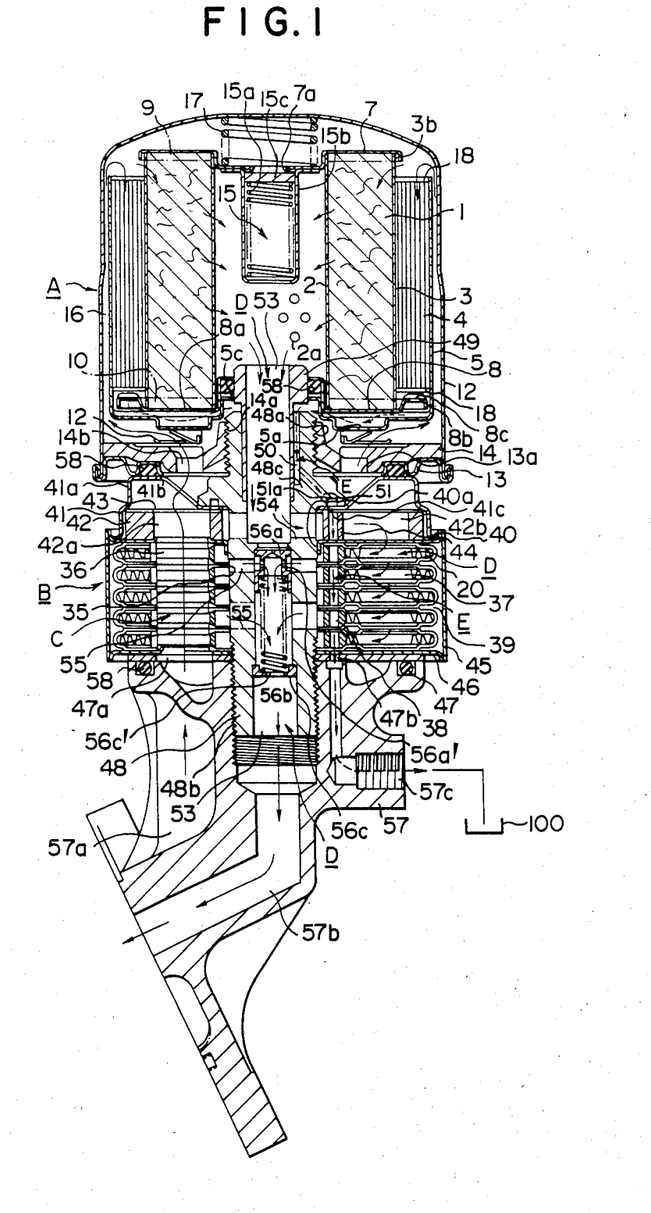
FIG. 1 is a sectional view of a first embodiment of the present invention.

It is to be noted that the reference numeral 15 in FIG. 1 denotes a relief valve which is constituted by a spring 15a, a metallic cylinder 15b and a valve body 15c, while the numeral 17 represents a spring. Further, the numeral 16 represents an oil flow passage within the casings 12 and 13.

The following is a description of an oil cooler B which serves as a heat exchanger.

Each of the heat exchanger units 20 is constituted by ring-shaped first and second plates 21 and 22 of a stainless steel which have their respective outer peripheries secured to each other by caulking.

The construction of each heat exchanger unit 20 will first be explained.

Figure 2:
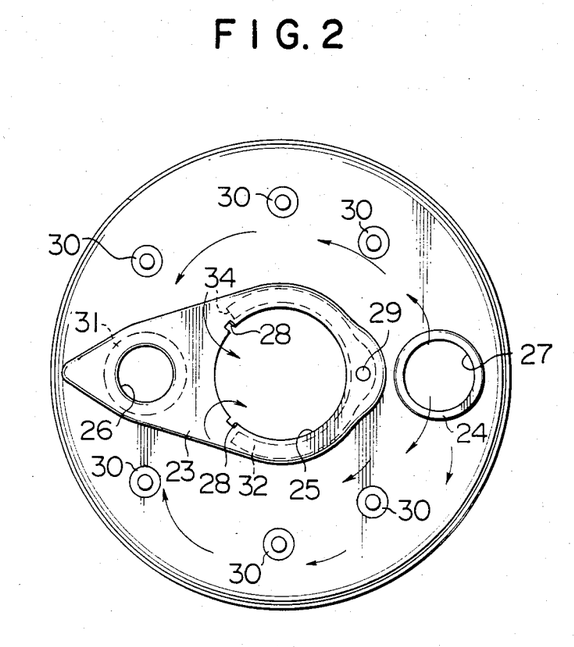
FIG. 2 is a front elevational view of first and second plates employed in the embodiment shown in FIG. 1.
Figure 3:
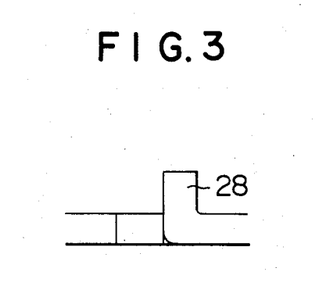
FIG. 3 is a fragmentary view of the first and second plates.

Referring to FIG. 2 which is a front elevational view of the first and second plates 21 and 22, each of the plates 21 and 22 has projections 23 and 24 provided at two positions close to its center. The projection 23 is formed with a through-hole 25 and a communicating bore 26, while the projection 24 is formed with an inlet bore 27. A bent piece 28 which is shown in FIG. 3 is provided at each of the two positions on the outer periphery of the through-hole 25 and on the side of the through-hole 25 which is remote from the inlet bore 27. The projection 23 further has a small bore 29 which is disposed on the side of the through-hole 25 which is closer to the inlet bore 27. A plurality of retainer portions 30 project from the outer periphery of each of the plates 21 and 22.

Figure 4:
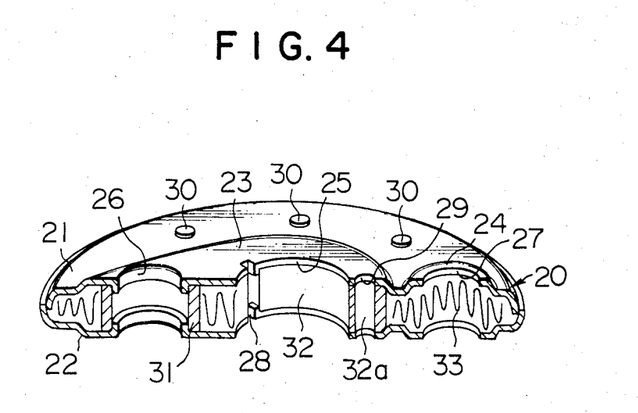
FIG. 4 is a sectional perspective view of a heat exchanger unit employed in the embodiment shown in FIG. 1.

Referring now to FIG. 4 which is a sectional perspective view of one heat exchanger unit 20, an annular ring 31, a collar 32 and heat exchanger fins 33 are disposed within the heat exchanger unit 20 and secured by means of brazing.

Figure 5:
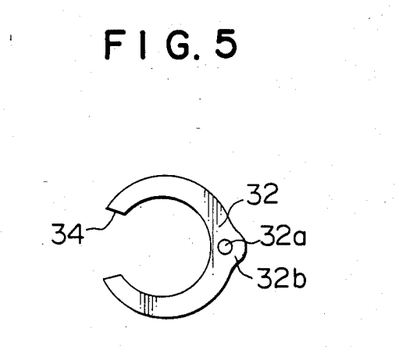
FIG. 5 is a front elevational view of a collar employed in the embodiment shown in FIG. 1.

The ring 31 is disposed in the unit 20 in such a manner as to correspond to the communicating bore 26. The collar 32 is formed by partially cutting a ring-shaped material such as to provide a cut portion 34 whereby it assumes a substantially C-shaped form as a whole in plan view, as shown in FIG. 5. The collar 32 is formed with a protuberance 32b on the side thereof which is remote from the cut portion 34, and a small bore 32a is formed in the protuberance 32b in such a manner as to provide communication between the upper and lower end faces of the collar 32. (It is to be noted that, if the collar 32 has a thickness which allows the small bore 32a to be satisfactorily formed therein, it is not necessary to form the protuberance 32b. Moreover, the small bore 32a may be disposed at any other position, provided that it is formed in a portion of the collar 32). Since the collar 32 is positioned in such a manner that each of the two end faces thereof at the cut portion 34 abuts against the respective bent pieces 28 of the plates 21 and 22, the cut portion 34 is located on the periphery of the through-hole 25 and at the side thereof which is remote from the inlet bore 27, while the small bore 32a of the collar 32 is located at a position which coincides with the respective small bores 29 of the plates 21 and 22.

The above-described heat exchanger units 20 are laminated in a plurality of layers in a manner such as that shown in FIG. 1. Since the two adjacent heat exchanger units 20 are positioned with respect to each other by virtue of the retainer portions 30 formed on the plates 21 and 22, the through-holes 25, the communicating bores 26, the inlet bores 27 and the small bores 29 formed in the plates 21 and 22 of the adjacent heat exchanger units 20 are respectively communicated with each other, thus forming a through-passage 35, a communicating passage 36, an inlet passage 37 and a subsidiary inlet passage 38, respectively. Further, a space 39 is formed between the two adjacent heat exchanger units 20 by virtue of the abutment between the respective projections 23 and 24 of the plates 21 and 22 and is filled with cooling water.

A ring-shaped metallic upper casing 40 has oil passing bores formed close to its center such as to correspond to the communicating passage 36, the inlet passage 37 and the subsidiary inlet passage 38, respectively. The casing 40 further has a downward flange portion 40a formed in its center and at a position which corresponds to the through-passage 35, thus providing a burring bore.

A ring-shaped metallic filter washer 41 is formed with a ring-shaped projection 41a. The filter washer 41 has a plurality of oil passing bores 41b formed close to its center and an oil passing bore 41c formed at a position which corresponds to the subsidiary inlet passage 38. The filter washer 41 is secured at its outer periphery to the upper casing 40 by means of brazing.

A ring-shaped block member 42 is provided on the upper surface of the upper casing 40 and is formed with an oil passing bore 42a and a space 42b at positions which respectively correspond to the communicating passage 36 and the inlet passage 37.

A ring-shaped seat plate 43 is provided on the upper surface of the block member 42 and is formed with commucating bores at positions which respectively correspond to the communicating passage 36 and the subsidiary inlet passage 38.

A pipe 44 is provided between the seat plate 43 and the upper casing 40 and at a position which corresponds to the subsidiary inlet passage 38 so that the pipe 44 communicates with the oil passing bore 41c of the filter washer 41.

The upper casing 40, a cylindrical casing 45 and a lower casing 46 are secured together at their respective outer peripheries by means of brazing in such a manner as to house a plurality of heat exchanger units 20. The cylindrical casing 45 is provided with two pipes (not shown) which allow cooling water to be led in and out of the space 39. The lower casing 46 is also formed with a communicating bore in correspondence with the communicating passage 36.

A retainer plate 47 is provided on the lower surface of the lower casing 46 and is also formed with oil passing bores 47a and 47b at respective positions which correspond to the communicating passage 36 and the subsidiary inlet passage 38, respectively.

A bolt 48 is disposed in the through-passage 35 which is located in the center of the oil cooler B. The bolt 48 is provided at its upper part with a threaded portion 48a onto which the washer 14 of the oil filter A is screwed. The bolt 48 is further provided at its lower part with a threaded portion 48b onto which a mounting member 57 is screwed. A pin 49 is press-fitted into the center of the upper part of the bolt 48, and a subsidiary inlet passage 50 is formed on one side surface of the pin 49. The bolt 48 has a flange portion 48c which is formed with a communicating bore 51. One open end of the communicating bore 51 is communicated with the inlet passage 50, while the other open end of the communicating bore 51 is communicated with the pipe 44 through the seat plate 43. Since the flange portion 48c of the bolt 48 is secured to the seat plate 43 by screwing, the communicating bore 51 is communicated with the pipe 44 through an annular groove 51a.

A main inlet passage 53 is axially formed in the center of the bolt 48 and the pin 49. A plurality of oil passing bores 54 and 55 are formed in the side surface of the bolt 48 such as to communicate with the main inlet passage 53. The open end of each of the oil passing bores 54 is communicated with the space 42b formed by the block member 42, while the open end of each of the oil passing bores 55 is communicated with the cut portion 34 of the collar 32 within each of the heat exchanger units 20.

A relief valve 56 is provided in the main inlet passage 53 of the bolt 48 below the oil passing bores 54. The relief valve 56 is constituted by a valve body 56a, a spring 56b and a stopper 56c. The valve body 56a is cylindrical and has its upper surface abutting against a valve seat which is formed on the bolt 48. A plurality of oil passing bores 56a' are formed in the side surface of the valve body 56a in such a manner as to oppose the respective oil passing bores 55 of the bolt 48. On the other hand, the stopper 56c has a ring shape and is secured within the main inlet passage 53, and an oil passing bore 56c' is formed in the center of the stopper 56c.

The following three passages are formed within the oil cooler B by means of the above-described constituent elements thereof: namely, an oil communicating passage C which introduces lubricating oil into the oil filter A; a main oil inlet passage D which introduces the lubricating oil which has been cleaned by passing through the first filter element 1 of the oil filter A into the oil cooler B for the purpose of effecting heat exchange therein; and a subsidiary oil inlet passage E which introduces the lubricating oil which has been filtered by the second filter element 4 of the oil filter A.

The reference numeral 57 represents a mounting member for mounting the oil cooler B on an engine block (not shown). The mounting member 57 is provided with: an oil inlet passage 57a which introduces lubricating oil from a lubricated section (not shown) of an internal combustion engine into the oil communicating passage C of the oil cooler B; an oil outlet passage 57b which introduces to the lubricated section the lubricating oil which has been cleaned by the first filter element 1 of the oil filter A and then subjected to heat exchange by passing through the main oil inlet passage D of the oil cooler B; and an oil outlet passage 57c which introduces the lubricating oil to a portion which is lower in terms of pressure than the lubricated section, e.g., an oil reservoir 100, the lubricating oil having been cleaned by the second filter element 4 of the oil filter A and passed through the subsidiary oil inlet passage E of the oil cooler B.

It is to be noted that the reference numeral 58 in FIG. 1 denotes sealing ring members which are respectively disposed between the oil filter A and the oil cooler B and between the latter and the mounting member 57.

The operation of the above-described arrangement will now be described.

Referring to FIG. 1, the lubricating oil which has been mixed with fine carbon particles and the like at the lubricated section or the like of the internal combustion engine enters the oil inlet passage 57a of the mounting member 57, passes through the oil communicating passage C of the oil cooler B and reaches the oil flow passage 16 in the oil filter A, where one part of the oil flows into the first filter element 1 through the oil passing bores 3b of the partition member 3, while the other part of the oil flows into the second filter element 4 through the filter paper 18 disposed at the upstream end of the element 4.

The oil flowing into the first filter element 1 is filtered and cleaned by the element 1 and then reaches the main oil inlet passage D of the oil cooler B through a multiplicity of small bores 2a of the reinforcing member 2.

This oil enters the main inlet passage 53 formed in the bolt 48, passes through the oil passing bores 54 and flows into the inlet bore 27 of each of the plurality of heat exchanger units 20 from the inlet passage 37 thereof. The oil flowing into each heat exchanger unit 20 flows along the outer periphery of the collar 32 within the unit 20 in such a manner as to be subjected to heat exchange with the cooling water filled in the space 39 and then flow out of the heat exchanger unit 20 from the cut portion 34 of the collar 32. The oil flowing out of each of the heat exchanger units 20 flows into the main inlet passage 53 inside the bolt 48 again from the plurality of oil passing bores 55 formed in the side surface of the bolt 48. A part of the oil flowing into the main inlet passage 53 from the oil passing bores 55 enters the oil bore 55a' formed in the valve body 55a of the relief valve 55, passes through the relief valve 55 and flows into the main inlet passage 53 from the oil passing bore 55c' formed in the stopper 55c of the relief valve 55.

The oil which has thus been cooled through heat exchange by passing through a series of main oil inlet passages D passed through the oil outlet passage 57b of the mounting member 57 and lubricates and cools the lubricated portion of the internal combustion engine before returning to the oil reservoir.

On the other hand, the oil flowing into the second filter element 4 passes axially therethrough. In consequence, fine carbon particles contained in the oil are particularly adsorbed by the element 4. The oil thus cleaned then passes through the oil passing openings 8c of the end plate 8, the clearance between the end plate 8 and the reinforcing member 5 and the oil passing bores 5c of the reinforcing member 5 and reaches the subsidiary oil inlet passage E of the oil cooler B.

This oil passes through a series of subsidiary oil inlet passages E which are constituted by the subsidiary inlet passage 50 formed on the side surface of the pin 49, the communicating bore 51 formed in the flange portion 48c of the bolt 48, the pipe 44, the subsidiary inlet passage 38 formed by the respective collars 32 of the plurality of heat exchanger units 20 and the oil passing bore 47b of the retainer plate 47. The oil then passes through the oil outlet passage 57c of the mounting member 57 and returns to the oil reservoir. This oil is somewhat cooled in the oil cooler B through the heat exchange which takes place when the oil is passing through the oil cooler B.

In this case, the amount of oil which passes through the subsidiary oil inlet passage E in the oil cooler B is smaller than that of the oil which passes through the main oil inlet passage D therein: about 90% of the whole quantity of lubricating oil passes through the main oil inlet passage D; and about 10% passes through the subsidiary oil inlet passage E.

As has been described, the subsidiary oil inlet passage E in this embodiment is formed simply by providing the small bore 32a in the collar 32 disposed in each of the heat exchanger units 20 and forming an oil passing bore in each of the associated constituent members at a position corresponding to the small bores 32a. It is therefore possible to form the subsidiary oil inlet passage E without any increase in the size of the oil cooler B nor any lowering in the heat exchanger efficiency.

Further, since the bolt 48 and other mounting members of the oil cooler B are not subjected to any special machining or working, it is also possible for a conventional oil filter to be integrally mounted on the oil cooler B in accordance with this embodiment. Thus, the oil cooler B advantageously allows a conventional oil filter and the oil filter A having two filter elements to be interchangeably mounted thereon.

Figure 6:
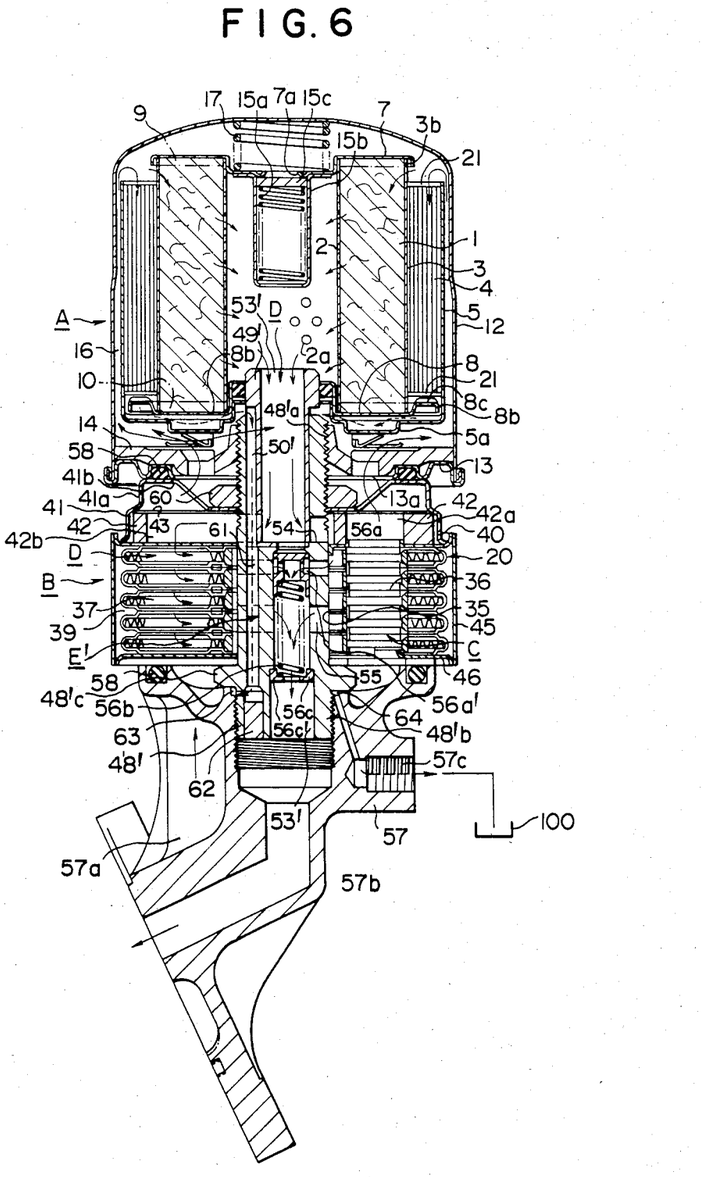
FIG. 6 is a sectional view of a second embodiment of the present invention.

A second embodiment of the invention will now be described with reference to FIG. 6.

This embodiment differs from the first embodiment in that the subsidiary inlet passage E through which the oil having passed through the second filter element 4 of the oil filter A flows is formed in a bolt 48' as a subsidiary oil inlet passage E'. Since the arrangement and operation of the other portion of this embodiment are similar to those in the first embodiment, description thereof is omitted. It is to be noted that the oil cooler B shown in FIG. 6 is for the sake of convenience drawn symmetrically with respect to that shown in FIG. 1 relative to the longitudinal axis thereof.

Threaded portions 48'a and 48'b are respectively formed on the upper and lower portions of the bolt 48', and a flange portion 48'c is integrally formed with the lower portion of the bolt 48'. The oil cooler B is secured by means of a nut 60 which is screwed onto the upper threaded portion 48'a of the bolt 48.

A pin 49' is press-fitted into the upper portion of the bolt 48', and a subsidiary inlet passage 50' is formed on the side surface of the pin 49'. A main inlet passage 53' is axially formed in the center of the bolt 48' and the pin 49', and an oil passing bore 61 which is communicated with the above-described subsidiary inlet passage 50' is axially formed in the bolt 48' on one side thereof. The oil passing bore 61 is disposed so as not to communicate with a plurality of oil passing bores 54 and 55 which are formed in the side surface of the bolt 48'. Further, a plug 62 is press-fitted into one end of the oil passing bore 61, thereby preventing the oil from flowing out from the oil passing bore 61 into the oil outlet passage 57b of the mounting member 57. A small bore 63 which provides communication between the oil passing bore 61 of the bolt 48' and the outside is formed below the flange portion 48'c of the bolt 48. The small bore 63 is communicated with an annular groove 64 which is provided in the center of the mounting member 57, the groove 64 being communicated with the oil outlet passage 57c.

Thus, the bolt 48' is formed with a series of subsidiary oil inlet passages E'.

It is to be noted that, since the bolt 48' of this embodiment has the main inlet passage 53' formed in its center at an eccentric position and the oil passing bore 61 serving as the subsidiary oil inlet passage E' is formed to one side of the main inlet passage 53', the diameter of the bolt 48' is slightly larger than that of the bolt 48 of the first embodiment.

Figure 7:
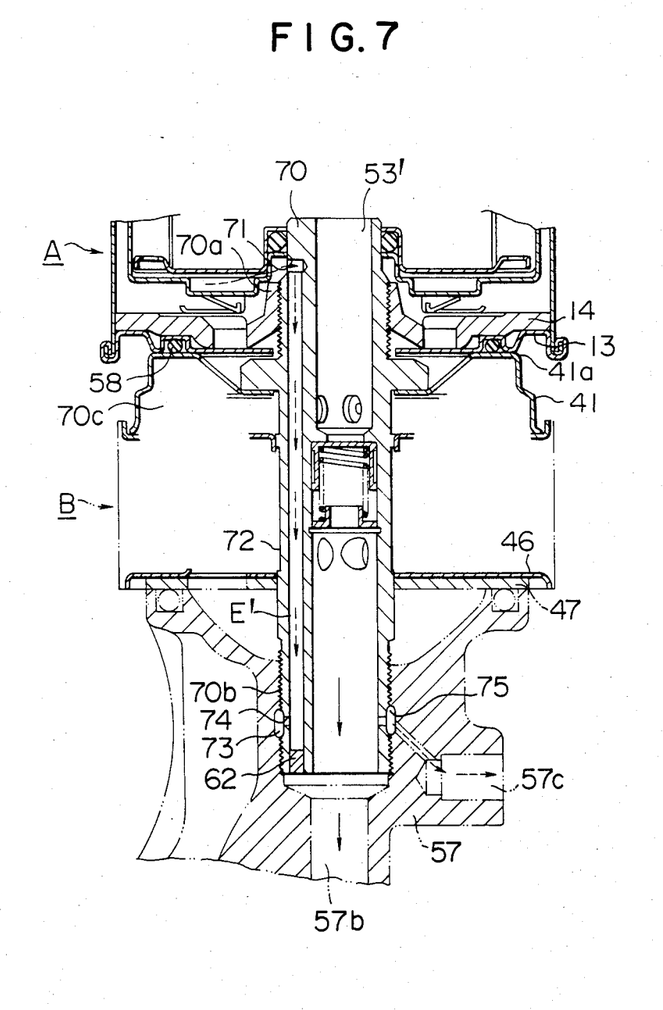
FIG. 7 is a sectional view of a part of a third embodiment of the present invention.

A third embodiment of the invention will now be described with reference to FIG. 7. In this embodiment, the subsidiary oil inlet passage E' is provided inside a bolt 70 in a manner similar to that in the second embodiment. However, this embodiment somewhat differs from the second embodiment: for example, no pin 49 is press-fitted into the bolt 70.

The bolt 70 is provided on its upper part with a threaded portion 70a on which the washer 14 of the oil filter A is screwed. The bolt 70 is further provided on its lower part with a threaded portion 70b on which the mounting member 57 is screwed. A flange portion 70c for clamping the oil cooler B is integrally formed at the upper portion of the bolt 70. A subsidiary inlet bore 71 is formed in the bolt 70 above the threaded portion 70a in such a manner as to extend toward the inside of the bolt 70 from its outer peripheral surface. The subsidiary inlet bore 71 communicatably intersects a subsidiary oil passing bore 72 which is formed in the bolt 70 such as to extend axially of the bolt 70 from its lower end face. One end of the subsidiary oil passing bore 72 is closed by a plug 62 which is press-fitted thereinto. Further, the threaded portion 70b is provided with an annular groove 73 which is formed by removing several turns of thread from the threaded portion 70b. The annular groove 73 is communicated with the subsidiary oil passing bore 72 through a subsidiary outlet bore 74. The mounting member 57 is also provided with an annular groove 75 at a position corresponding to the annular groove 73 on the threaded portion 70b, the annular groove 75 being formed by removing several turns of thread formed on the mounting member 57. The annular groove 75 is communicated with the oil outlet passage 57c. Thus, the bolt 70 is also formed with a series of subsidiary oil inlet passages E'.

It is to be noted that, although the heat exchanger of the invention is employed as an oil cooler in the above-described embodiments, it is possible for the invention to be employed to effect heat exchange for other kinds of fluid. For example, it is possible for the heat exchanger of the invention to be employed for heat exchange of torque converter oil or the like. Moreover, although the above-described oil cooler is mounted on the engine block through a mounting member, the oil cooler may be directly mounted on the engine block by employing a bolt.

As has been described above, the oil cooler is formed with a subsidiary oil inlet passage which communicates with the second filter element of the oil filter. Therefore, it is advantageously possible according to the present invention to easily integrate the oil cooler and an oil filter having two filter elements without any need to provide the piping which has heretofore been required to mount such an oil filter on a conventional oil cooler and which has prevented them from being integrated with each other. In addition, since it is only necessary for the oil cooler to be additionally formed therein with the subsidiary oil inlet passage, it is conveniently possible for the oil cooler to be mounted with improved facility without increasing its external dimension nor lowering the heat exchanger efficiency.

Although the invention has been described through specific terms, it is to be noted here that the described embodiments are not exclusive and various changes and modifications may be imparted thereto without departing from the scope of the invention which is limited solely by the appended claims.

What is claimed is:

1. A heat exchanger apparatus comprising:
   a heat exchanger constituted by a multiplicity of heat exchanger units laminated one upon another;
   a filter having first and second filter elements for removing any unnecessary substance mixed into a working fluid;
   holding means, including an end plate, for holding said filter therein;
   a fixing member having a cylindrical end portion to which said end plate faces and disposed such as to extend through said heat exchanger so that said heat exchanger and said filter are integrally secured to each other;
   a communicating passage provided within said heat exchanger such as to communicate with the upstream side of said first and second filter elements;
   a main flow passage provided within said heat exchanger such as to communicate with the downstream side of said first filter element;
   a subsidiary flow passage provided within said heat exchanger such as to communicate with the downstream side of said second filter element;
   single seal means for separating said main flow passage and subsidiary flow passage, said seal means being contacting at said end portion of said fixing member so that said seal means travels only a short distance on an outer surface of said end portion of said fixing member when said filter is fixed with said fixing member; and
   embracing means provided in said end plate, including three wall means, for embracing all surfaces of said seal means except one surface on which said end portion of said fixing member abuts.

2. A heat exchanger apparatus according to claim 1, wherein said subsidiary flow passage is communicated with an oil reservoir so that it is easy for a pressure difference to be produced between the upstream and downstream sides of said second filter element.

3. A heat exchanger apparatus according to claim 1, wherein said subsidiary flow passage is constituted by a subsidiary inlet passage provided in one portion of said fixing member on the side thereof which is located at said filter and a flow passage which is defined by small aligned bores respectively formed in collars disposed in said heat exchanger.

4. A heat exchanger apparatus according to claim 1, wherein said subsidiary flow passage is constituted by a subsidiary inlet passage provided in one end portion of said fixing member on the side thereof which is located at said filter and a through-hole axially bored inside said fixing member.

5. A heat exchanger apparatus according to claim 4, wherein said through-hole axially bored inside said fixing member is communicated with an annular groove provided on a threaded portion formed on the other end portion of said fixing member, said annular groove being constituted by a part of said threaded portion where no thread is formed.

6. A heat exchanger apparatus according to claim 4, wherein said fixing member is provided therein with a through-hole extending axially thereof and eccentrically with respect to the center thereof, said through-hole constituting a part of said main flow passage, and said fixing member further being provided therein with a communicating bore extending axially thereof and sidewardly of said through-hole, said communicating bore constituting a part of said subsidiary flow passage.

* * * * *